2 Sheets—Sheet 1.

D. D. CATTANACH.
Treating Linseed and Kindred Oils.

No. 222,983. Patented Dec. 30, 1879.

Witnesses:
R. F. Barnes
Lev. Suly

Inventor:
Donald D. Cattanach
by Ellis Spear
Attorney

N. PETERS, PHOTO-LITHOGRAPHER, WASHINGTON, D. C.

2 Sheets—Sheet 2.

D. D. CATTANACH.
Treating Linseed and Kindred Oils.

No. 222,983. Patented Dec. 30, 1879.

Witnesses:

Inventor:
Donald D. Cattanach,
by Elee Spear
Attorney.

UNITED STATES PATENT OFFICE.

DONALD D. CATTANACH, OF PROVIDENCE, RHODE ISLAND.

IMPROVEMENT IN TREATING LINSEED AND KINDRED OILS.

Specification forming part of Letters Patent No. 222,983, dated December 30, 1879; application filed November 8, 1879.

*To all whom it may concern:*

Be it known that I, DONALD D. CATTANACH, of Providence, in the county of Providence and State of Rhode Island, have invented a new and useful Improvement in Treating Oils; and I do hereby declare that the following is a full, clear, and exact description of the same.

My invention relates to an improved process and apparatus for treating linseed and kindred oils to render them more serviceable in the various arts in which they are commonly used.

The process is an improvement upon that for which Letters Patent of the United States were granted me on the 30th day of December, 1873, and numbered 146,044; and it consists in the treatment of such oils by regulated fermentation induced and maintained by mechanical means, whereby all the atoms of the oil are kept in a continuous state of vibration until brought to the required condition.

This improved process is hereinafter more fully described in connection with the special apparatus which may be used to carry out the process. This apparatus is shown in the annexed drawings, in which—

Figure 1:
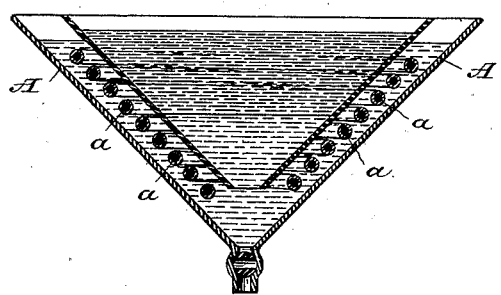
Figure 2:
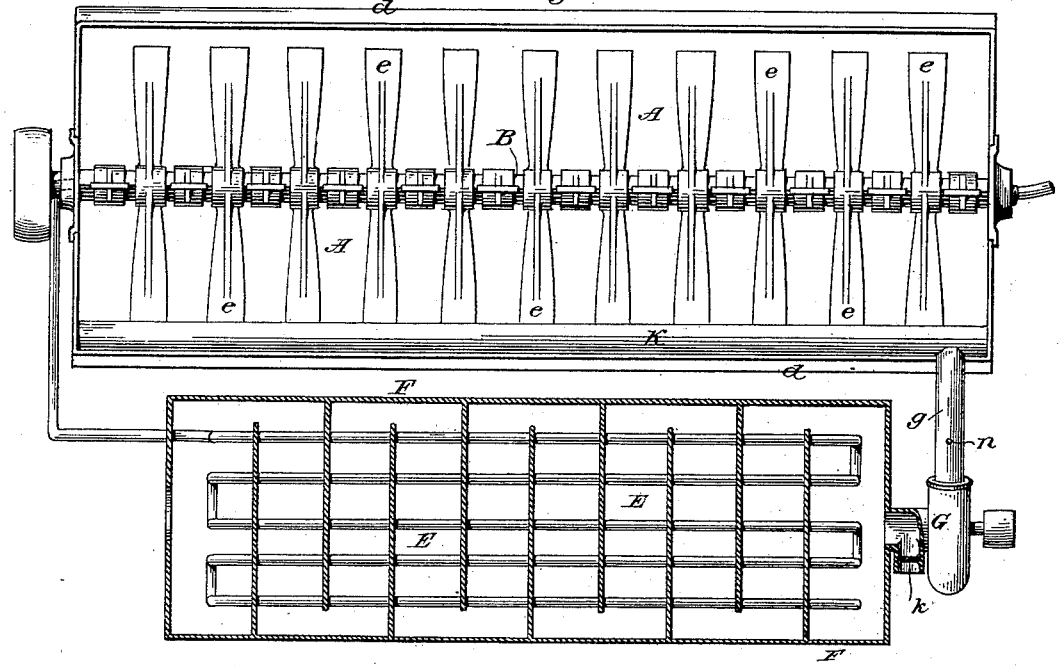
Figure 3:
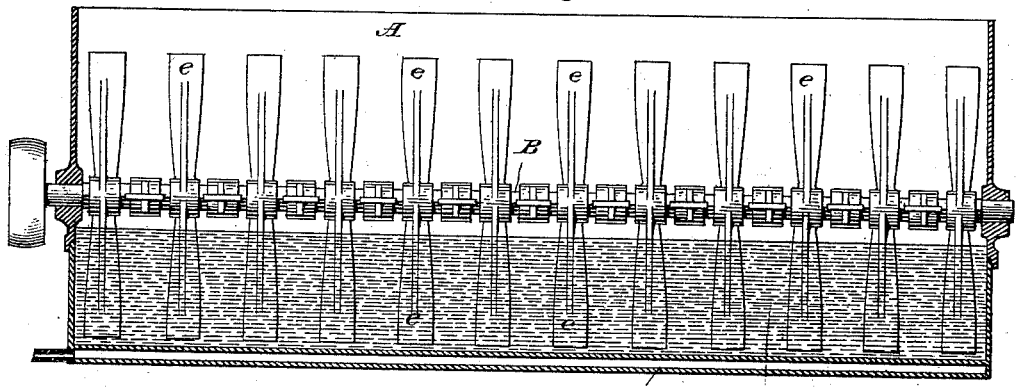
Figure 4:
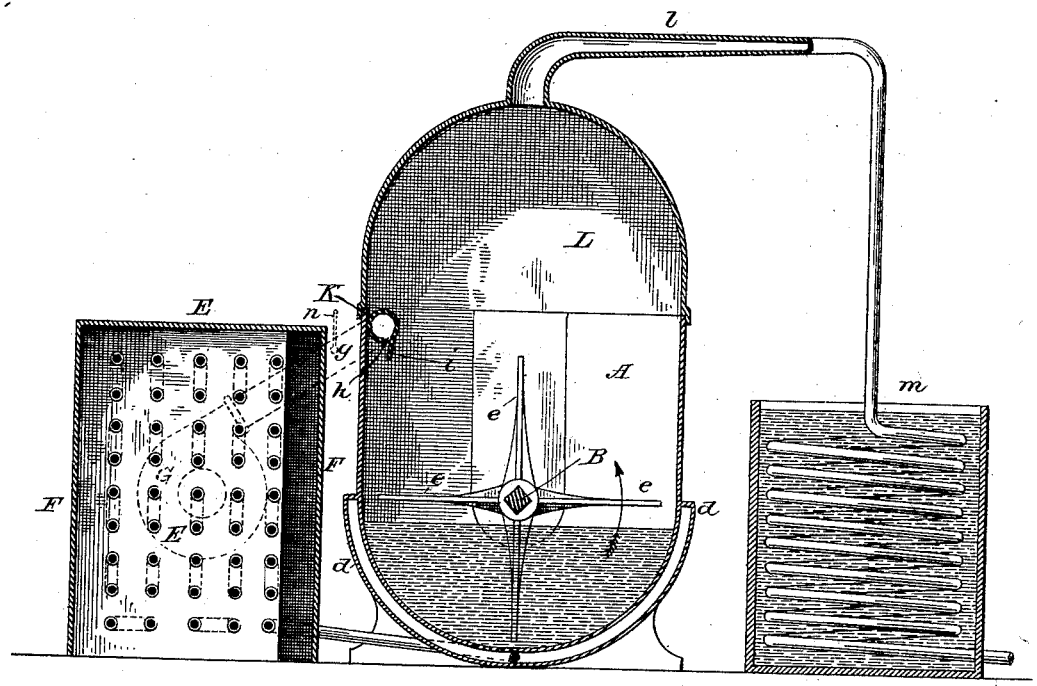
Figures 5, 6:
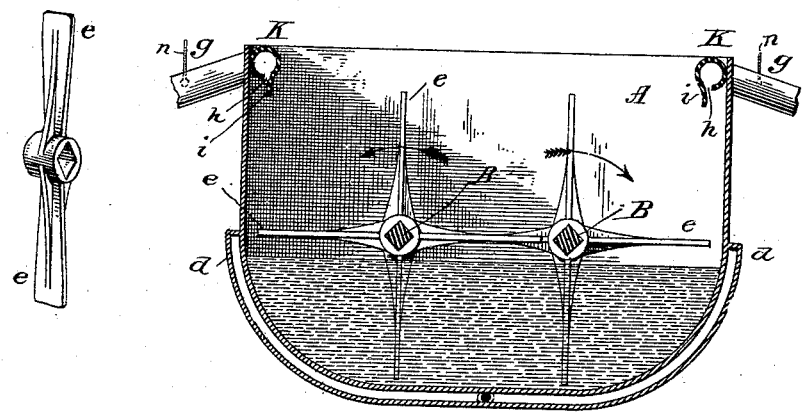

Figure 1 represents a section of the reservoir used in the first part of the process. Fig. 2 is a perspective view of the apparatus used in the second part of the process. Fig. 3 is a longitudinal view of said apparatus; Fig. 4, a transverse section. Fig. 5 represents the blades detached, and Fig. 6 a modification of the tank and agitating apparatus.

In carrying out my invention I take of ordinary linseed or kindred oils a given quantity—for illustration, five hundred gallons—which I place in a suitable tank with about one-fifth its weight of water, which may be renewed when reduced by evaporation, although the proportion of the water may be greatly varied without material change in the result. The water, being heavier, rests at the bottom of the tank. To that part of the tank which is in contact with the water I apply heat by means of steam. The weight of the oil upon the water renders it possible to carry the heat of the oil above 212° Fahrenheit; but it should not, ordinarily, be raised higher than 250° Fahrenheit to produce the best results.

The heat of the water in contact with the oil, and that of the steam rising from the water through the oil, will raise the temperature of the oil and retain it at a moderate and even degree. It is better, however, to give the oil frequent stirring, in order that the steam may be diffused more evenly throughout the mass of the oil, and act more uniformly upon the whole.

By the steam rising through the oil at the temperature specified the albuminous substances in the oil are thoroughly coagulated, which coagulation causes them to precipitate to the surface of the water. The coagulation of these albuminous substances and their precipitation also tend to eliminate fibrous and other foreign substances from the oil, which are carried down mechanically with the coagulated albumen. Whatever resinous substances there may be in the oil are also eliminated by this process, and are diffused in a milky condition throughout the water.

This part of the process is carried on until the albuminous, fibrous, and other substances are removed from the oil and either deposited upon the surface of the water or held in solution therein. The materials are then allowed to stand for twenty-four hours, or any longer time, as may be desired, in order that the separation of the parts may be thoroughly completed.

The oil may be drawn off by a pump or siphon without disturbance of the water or residuum upon its surface; or the water and impurities may be drawn off by the use of the apparatus shown in Fig. 1, in which the tank A is represented of conical form, provided at the bottom with a pipe, by means of which the water may be drawn from the tank. This tank is formed with an inner partition, which constitutes an inner conical tank for the reception of the oil. A steam-coil, *a a*, is placed between the inner and outer partitions, for the purpose of heating the water; or the steam-coil can be placed in the water without the use of a partition.

When the albuminous and other objectionable elements are eliminated from the oil and precipitated, the water may be drawn through the pipe below and the oil may be left in the tank.

The construction of the tank and the narrow passage render it easy to draw off all the sedimentary matter without any loss of the oil. Although this apparatus may be found useful, it is manifestly not absolutely essential for the purpose, and other forms of tank may be conveniently used.

After the oil has been subjected to this preliminary treatment, as a second step in the process it is put into an open vessel, made in any convenient shape, and surrounded by a steam-jacket. It is there subjected to heat from steam, from 212° to not higher than 250° Fahrenheit. The heat of the oil should not at any time be below 212°, and may be preferably kept at or near 250° Fahrenheit. This treatment not only expels all the moisture from the oil, but another favorable result also takes place. The heat being kept constantly at or near 250° for two or three days, the oil so treated in the open tank requires no further treatment by metallic oxides, but becomes a dry oil without their use. The resulting gum or oils so treated are of more value for some purposes than if treated in the ordinary way by metallic oxides; but if it be necessary to hasten this part of the operation, then oxides may be used without serious disadvantage, for the reason that any of the oxides which may remain in the oil after the treatment above described will be removed by the subsequent part of the process.

The third and principal part of my improved process may be carried on by means of the apparatus shown in Figs. 2, 3, and 4 of the drawings, and is best described in connection therewith. In this apparatus is a tank, A, of a suitable capacity, according to the amount of oil required to be treated at any one time; but it should be of a size greater by four or five times than the bulk of oil which is to be treated in it at once, in order that the oil may be held near the bottom.

The bottom of the tank A is provided with a steam-jacket, d, extending over the bottom, and a short distance up the sides of the tank. The bottom of the tank is formed on a curve, but the ends are plain surfaces, as shown in the figure.

Arranged longitudinally within the tank is a shaft, B, having its bearing in the ends of the tank. This shaft is provided with narrow blades e e, arranged radially upon it in pairs, those of each pair being exactly opposite each other, the greater width of the blades being arranged longitudinally of the shaft. The blades may be from one and three-fourths to two inches wide.

The distance between each set of parallel blades should be just equal to the width of the blades themselves, and between each set of parallel blades is arranged another set of blades at right angles thereto, and in the same plane as the spaces between the blades first specified. The construction and arrangement of these blades are such that when the shaft is in motion upon its axis, one set of blades moves through one-half the space occupied by the oil, while the succeeding row moves through those spaces between the blades of the preceding row. This arrangement of the blades effects a thorough stirring of the oil, and causes a peculiar movement of it, for purposes hereinafter described. The shaft may be rotated by any suitable mechanism.

The revolutions of the shaft being from seventy to ninety per minute, the resistance of the oil, arising from its weight and tenacity, renders it necessary that the shaft should be of great strength. I preferably make the blades in the form shown in Fig. 5. These are preferably made wider at the outer ends, and gradually tapering toward the shaft, and are ribbed on the narrower parts to give increased strength.

Upon one side of the tank is arranged a heating-coil, E, placed vertically in the manner of ordinary heating-coils for buildings.

It is inclosed within a shell or case, F, which shell or case is provided with vertically-arranged transverse partitions extending from opposite sides alternately part of the way across its width, as shown in Fig. 2.

The steam-coil, which may be supplied either with exhaust or live steam, keeps up the temperature of the interior of the case, through which air is caused to pass in a zigzag direction over the said coils. The motion of the air is caused by an exhaust-fan, G, located at one end of the case. This exhaust-fan discharges through a pipe, g, into a slotted tube, K, arranged within the tank A, and upon one side above the surface of the oil, and also above the blades, so as to be out of the way of the oil. The tube K is provided with a narrow slot, h, and a flange, i, the construction being such that the air forced in the tube K by the fan will be expelled in an elongated stream through the slot h and past the flange i downward along the curved side and bottom of the tank. The flange i also serves to protect the slot in the tube and prevent it from becoming clogged by the oil. A thermometer, n, is located upon the pipe, which leads from the case to the slotted pipe K, the bulb of said thermometer being placed within the said pipe, so that the temperature of the air forced into the tank may be accurately and certainly indicated on the stem above the pipe.

A pipe or opening, k, is also provided in the fan, from which cold air may be drawn into the fan from any convenient space outside of the casing which holds the steam-coil. This pipe or opening in the fan is also provided with a valve, by which the cold air may be admitted in regulated quantities, or excluded altogether.

The steam-jacket d is connected to a steam-pipe, and also with a cold-water supply, for purposes hereinafter explained.

The walls of the tank are carried up a considerable distance above the point reached by the blades in their upward movement, so as to be of a capacity greater than that required for the amount of oil to be treated at any one time, as hereinafter explained.

For convenience of removal of the gum the shaft B may have its bearing in removable sections of the end pieces, as shown in Fig. 2, such sections being secured by flanges to the main part of the ends of the tank.

The bottom of the tank is not formed upon a true curve, but slightly flattened, so that the blades, which are arranged to move as near to the bottom as convenient without touching when in approximately vertical position, may pass in their upward and downward movement at a little distance from the sides of the tank.

A hood or cover, L, is fitted to the tank, so as to close the top thereof. This hood or cover is provided with a pipe, $l$, which terminates in a coil, $m$, for purposes hereinafter described.

Where large quantities of the oil are to be treated, I may prefer a modification of the tank and stirring apparatus. (Shown in Fig. 6.) This consists of two shafts and duplicate air heating, regulating, and conducting mechanisms.

The shaft may be set, as shown in the figure, at little more than the length of the blade asunder, said blades being arranged on their respective shafts, so that the blade on one will pass between the blades on the other shaft. The shafts being made to revolve in opposite directions, so as to cause the oil to rise in the center and be thrown over and outward against the wall of the tank on each side, it is subjected to the action of the air from a pipe, K, on each side, and a more rapid action is thereby caused. Into the tank thus described the oil, having been treated as heretofore described, is placed in quantities sufficient to come, preferably, within four or five inches of the stirring-shaft. The apparatus being set in motion, the oil manifestly will be caused to move in an approximately circular path, being carried by the blades of the stirring-shaft. The shaft revolving in the direction of the arrow, the oil is thrown toward the side as it descends, and impinges against the wall of the tank beneath the air-tube K. It here meets the current of air, whereby its temperature is reduced or regulated, and, by reason of its contact with the air, it also parts with the gases generated, and showing an acid reaction. In its further movement it passes over the surface of the tank, which is heated by the steam-jacket $d$, when the generation of the acid gases is again renewed, when it is carried over again and thrown against the side, to be acted upon by the air-current, as heretofore explained.

The force of the air-current must be sufficient to carry off the gases produced by the fermentation, and for this purpose the size of the fan and its rate of motion must be adapted to the size of the tank, the amount of oil treated, and the rapidity of revolution of the shaft. I have found that a tank about twelve feet in length, containing three hundred gallons of oil under treatment, with a rate of revolution of the stirring-shaft of from seventy to ninety revolutions per minute, requires a seven-inch fan revolving from five to seven hundred times per minute.

After the oil has been thus treated to such an extent that it has become thickened, the gases are inclosed within the center of the mass of oil about the shaft, and are not permitted to escape by reason of the tenacity of said oil. I then discontinue, temporarily, the air-blast, and place in position over the tank the hood or covering heretofore described. I then introduce, by any suitable apparatus, any solvent, such as light distillates of petroleum or coal-tar, or any other suitable solvent which will not leave any residuum or discolor the gum. The rotation of the shaft is continued during the introduction of this solvent, and while it is acting upon the thickened oil. The oil being thereby dissolved, the air is turned on, and the gases which were contained within the mass of the oil are carried off with the vaporized solvent. This solvent, in the form of vapor, is conducted away by the pipe in the top of the hood, and may be condensed in the coil, so as to be used repeatedly without material loss. The stirring and the air-blasts are continued until the oil is again thickened, so as to inclose the gases and require a repetition of the application of the solvent. After the process has been completed, which requires, ordinarily, two or three applications of the solvent, the hot air is turned off and the cold air turned on, when the motion of the agitator is somewhat lessened. By this reduction of the speed of the stirring-blades, in connection with the cold air, the solvent is eliminated and further chemical reaction or fermentation is prevented, and the gum comes out pure and clear.

It is to be particularly noted, in connection with the part of my process above described, that the oil is placed in the agitating-tank at ordinary temperatures, which vary with the season and the weather. Before the agitation is commenced the steam is admitted to the jacket, to bring the temperature of the oil to the proper point—250° Fahrenheit, more or less, according to the purposes for which the product is intended. After the commencement of the agitation, the fermentation or chemical reaction which follows tends to raise the heat even above that imparted by the steam. The steam-coil or air-heating apparatus, in connection with the fan and cold-air pipe, affords means for accurately adapting the temperature of the air-blast, to regulate the temperature of the oil under treatment, and to keep the fermentation at a temperature of about 150° Fahrenheit, independently of any changes in the temperature of the atmosphere.

For certain purposes the cold air in connection with the agitation may be dispensed with, as the gum may be packed and stored for use with the small residuum of solvent retained therein; but when the gum is to be used dry, and no solvent required, the agitation with the application of cold air should be continued in order that all traces of the solvent may be eliminated. When the agitation with cold air is prolonged, for the purpose of obtaining the oil or dry gum entirely free from solvent, the steam may be shut off from the steam-jacket, and, if it be desired to arrest the fermentation at any stage of the process, cold water introduced instead.

For certain purposes the process may be arrested before the oil is reduced to a solid or gum-like substance, the oil, having been treated by the process above described, being useful for some purposes at different stages of the process.

The preliminary parts of the process are not essential to the production of the oil or gum, as the raw oil may be put into the agitating-tank and reduced to a thickened or gum-like condition without having been subjected to the action of the steam for the removal of the fibrous, resinous, and mucilaginous substances, or to the continued heat in the open vessel; but such treatment of the raw oil in the agitating-tank alone would require more time. Also, by the preliminary process the gases arising during the fermentation are not only less in quantity, but are also rendered less active and corrosive. In practice it has been found economical to carry on all the processes at the same time, using the waste-steam from the engine which operates the agitator and fan to heat the water on which the oil rests in the apparatus first described, and also to heat the oil alone in the open vessel.

The oil and gum produced by this regulated process of fermentation induced and continued by mechanical means, as above described, have qualities not possessed by oils treated by any other of the methods heretofore known. It is nearly colorless, being lighter than the natural color of the oil as it comes from the press, without the use of the ordinary sun or bleaching process. At the same time it is not liable to grow dark when applied to surfaces as a varnish, or after exposure to the air, as is the case with oils boiled or bleached by the sunning process, or made drying by the use of metal oxides.

The gum is distinguishable from that produced by the process described in my patent heretofore referred to, and more plainly from any produced by what is known as the "skin process," by its greater translucence in mass, by its nearly colorless condition in thin sheets, its uniform consistency throughout as it comes from the agitator, its superior tenacity and adhesiveness, by its superior property of retaining its colorless condition on exposure to the air, and by its freedom from acid gases. This freedom from acids renders the gum peculiarly well adapted to be used in connection with fibrous substances without danger of subsequent fermentation or combustion, and also for use with other gums for fine qualities of body-varnish.

I am aware that it is not new to treat oils by agitation in the presence of atmospheric air, and that it is also old to treat oils by stirring in heated vessels open to the air; also, by passing heated air through the oil at regulated temperature; and I do not broadly claim any such processes.

What I claim is—

1. In the described mode of treating linseed and kindred oils, the process consisting in stirring the oil in a closed tank, in the manner described, in applying to the oil thus stirred a regulated amount of heat, and in forcing into the current of oil a stream of air, also at regulated temperature, whereby a portion of the oil is alternately exposed to the action of the current of air and of the heated surface, as set forth.

2. The described process of treating linseed and kindred oils, consisting in, first, heating the oil in contact with water at the temperature specified; second, in heating it in contact with the air at the specified temperature; and, third, in stirring it in a close tank, heated, as described, with a stream of air at regulated temperature, applied to the current of oil, in the manner shown.

3. The described apparatus for treating oils, consisting of a horizontal tank having a rounded bottom and an elevated top, in combination with a shaft carrying blades, adapted to give the oil a rotary movement within the tank, and with a blower and pipe arranged upon the side of said tank, adapted to discharge a current of air into the current of oil at the proper point across said current of oil, and also in combination with heating apparatus, all as set forth.

4. In combination with the described tank, having the rounded bottom and elevated top, and having also a shaft placed longitudinally in said tank, and carrying blades adapted to give the oil rotary movement, as described, a blower, and a slotted tube extending the entire length of the tank, having connection with an air-heating device, and adapted to discharge air into the current of oil, as set forth.

5. The combination, with the tank having a horizontal shaft and stirring-blades, and heating apparatus at the bottom of said tank, of an air-heating apparatus, and a slotted pipe for introducing the heated air to the oil, and of a hood, L, and pipe $l$, as and for the purpose set forth.

In testimony whereof I have signed my name to this specification in the presence of two subscribing witnesses.

DONALD D. CATTANACH.

Witnesses:
S. W. SEELY,
L. L. MIDDLETON.